(12) United States Patent
Pack

(10) Patent No.: US 12,693,652 B2
(45) Date of Patent: Jul. 28, 2026

(54) METHODS AND MECHANISMS FOR PROCESS RECIPE OPTIMIZATION

(71) Applicant: Applied Materials, Inc., Santa Clara, CA (US)

(72) Inventor: Robert C. Pack, Morgan Hill, CA (US)

(73) Assignee: Applied Materials, Inc., Santa Clara, CA (US)

( * ) Notice: Subject to any disclaimer, the term of this patent is extended or adjusted under 35 U.S.C. 154(b) by 579 days.

(21) Appl. No.: 17/978,260

(22) Filed: Nov. 1, 2022

(65) Prior Publication Data

US 2023/0135102 A1 May 4, 2023

Related U.S. Application Data

(60) Provisional application No. 63/274,705, filed on Nov. 2, 2021.

(51) Int. Cl.
*G05B 19/4155* (2006.01)
*G06N 7/01* (2023.01)

(52) U.S. Cl.
CPC ........... *G05B 19/4155* (2013.01); *G06N 7/01* (2023.01); *G05B 2219/31338* (2013.01)

(58) Field of Classification Search
None
See application file for complete search history.

(56) References Cited

U.S. PATENT DOCUMENTS 11,353,847 B2 * 6/2022 Behandish ............. G06F 30/17
2014/0229409 A1 8/2014 Kaushal et al.
(Continued)

FOREIGN PATENT DOCUMENTS

CN 112771241 A 5/2021
JP 2018-67609 A 4/2018
(Continued)

OTHER PUBLICATIONS

Suzuki et al., "Multi-objective Bayesian Optimization using Pareto-frontier Entropy," Proceedings of the 37th International Conference on Machine Learning, Online, PMLR 119, 2020, pp. 1-10.
(Continued)

*Primary Examiner* — Sean Shechtman
(74) *Attorney, Agent, or Firm* — Lowenstein Sandler LLP

(57) ABSTRACT

An electronic device manufacturing system configured to performing, by manufacturing equipment, a first process on a first substrate according to a process recipe, wherein the process recipe comprises a plurality of setting parameters. The system then generates metrology data associated with a plurality of features and inputs the metrology data into one or more Bayesian probabilistic models. The system then receives an output from the one or more Bayesian probabilistic models based on the metrology data and at least one settings parameter of the plurality of setting parameters. The system then updates, based on the output of the one or more Bayesian probabilistic models, the process recipe by modifying at least one setting parameter of the plurality of setting parameters, and performs, by the manufacturing equipment, a second process on a second substrate according to the updated process recipe.

14 Claims, 12 Drawing Sheets

(56) References Cited

U.S. PATENT DOCUMENTS

| | | | | | |
|---|---|---|---|---|---|
| 2019/0240799 A1* | 8/2019 | Takeda | .................... | B24B 37/14 |
| 2020/0006100 A1* | 1/2020 | Clark | ................ | H01L 21/68707 |
| 2021/0110302 A1 | 4/2021 | Nam et al. | | |

FOREIGN PATENT DOCUMENTS

| | | | |
|---|---|---|---|
| TW | 202006817 A | 2/2020 |
| WO | 2021/081213 A1 | 4/2021 |

OTHER PUBLICATIONS

PCT International Search Report and Written Opinion for International Application No. PCT/US2022/048630 mailed Mar. 10, 2023, 11 pages.

* cited by examiner

Predictive System 110

Server Machine 170

Training Set Generator 172

Server Machine 180

Training Engine 182

Validation Engine 184

Selection Engine 185

Testing Engine 186

Model 190

Predictive Server 112

Predictive Component 114

Data Store 140

Network 130

Manufacturing Equipment 124

Sensors 126

Client Device 120

Corrective Action Component 122

Metrology Equipment 128

SYSTEM CONTROLLER 328 ⟷ DATA STORE 350

GAS PANEL

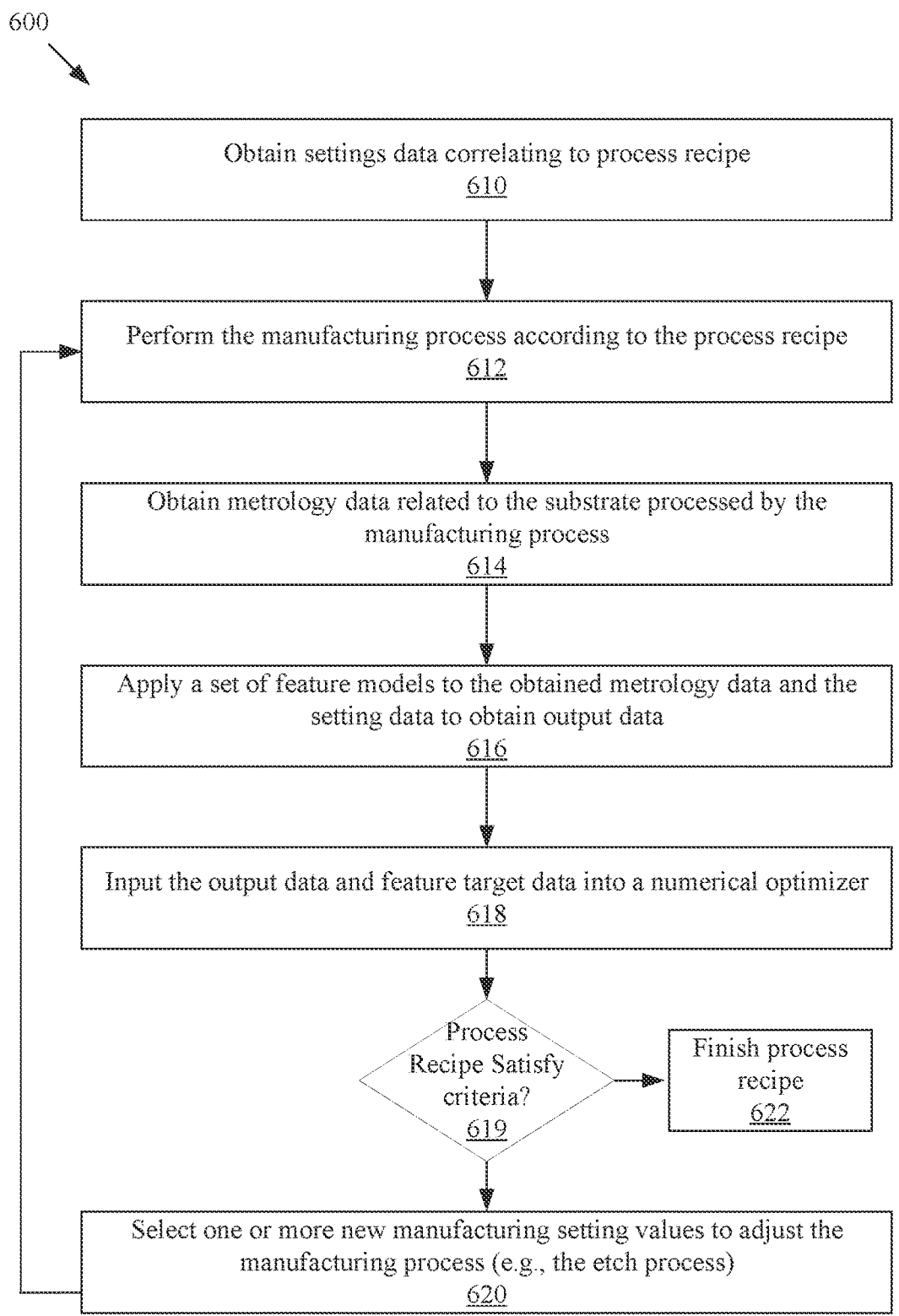

Obtain settings data correlating to process recipe
610

Perform the manufacturing process according to the process recipe
612

Obtain metrology data related to the substrate processed by the manufacturing process
614

Apply a set of feature models to the obtained metrology data and the setting data to obtain output data
616

Input the output data and feature target data into a numerical optimizer
618

Process Recipe Satisfy criteria?
619

Finish process recipe
622

Select one or more new manufacturing setting values to adjust the manufacturing process (e.g., the etch process)
620

FIG. 6

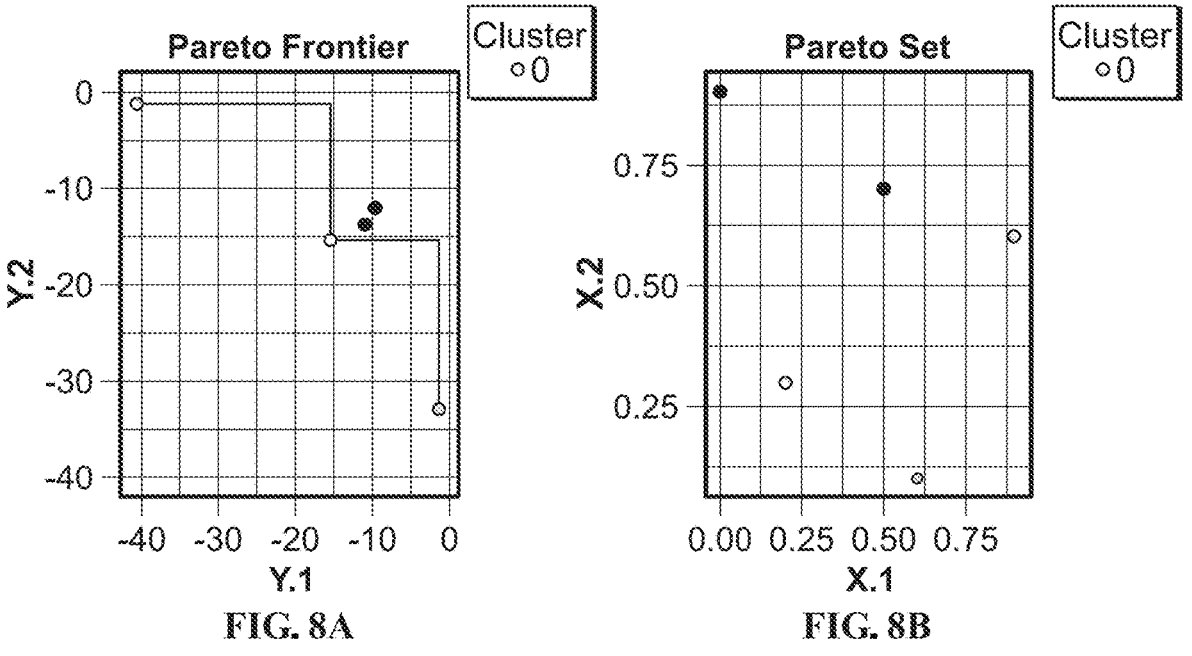
FIG. 8A                    FIG. 8B
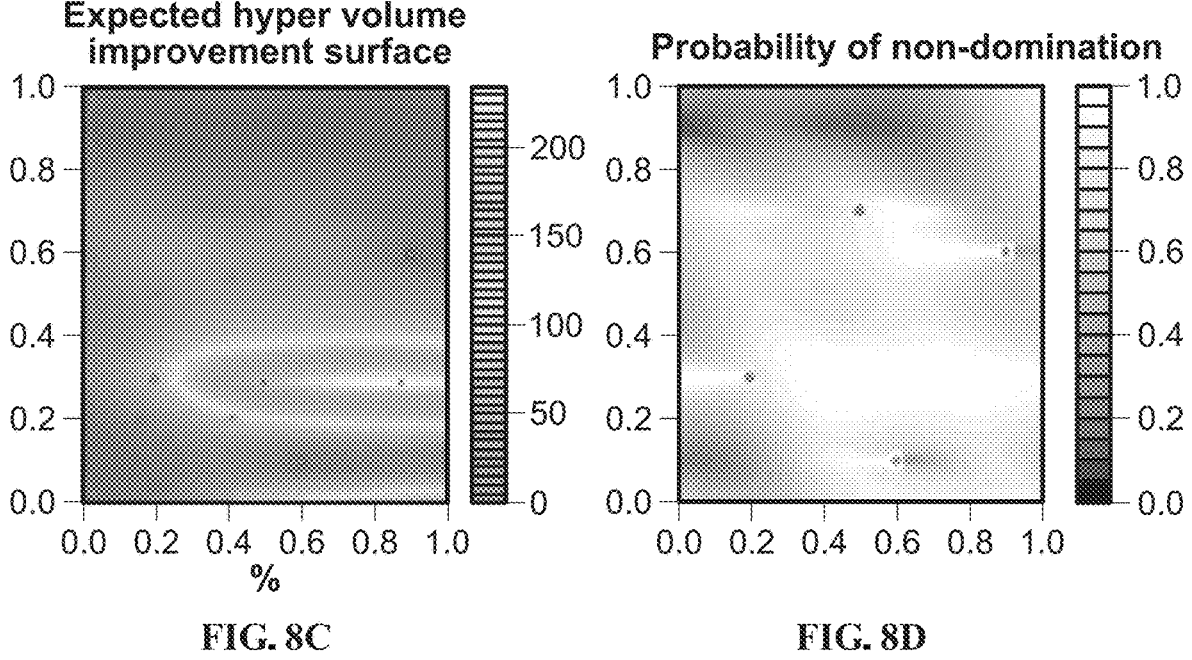
FIG. 8C                    FIG. 8D

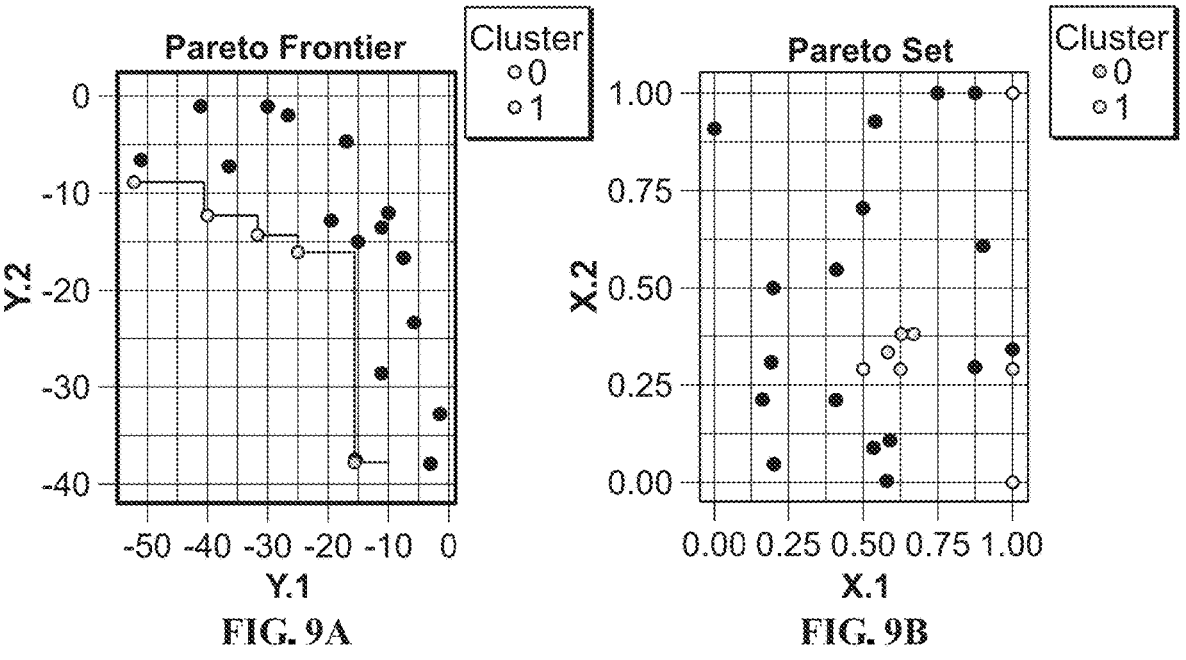
FIG. 9A
FIG. 9B
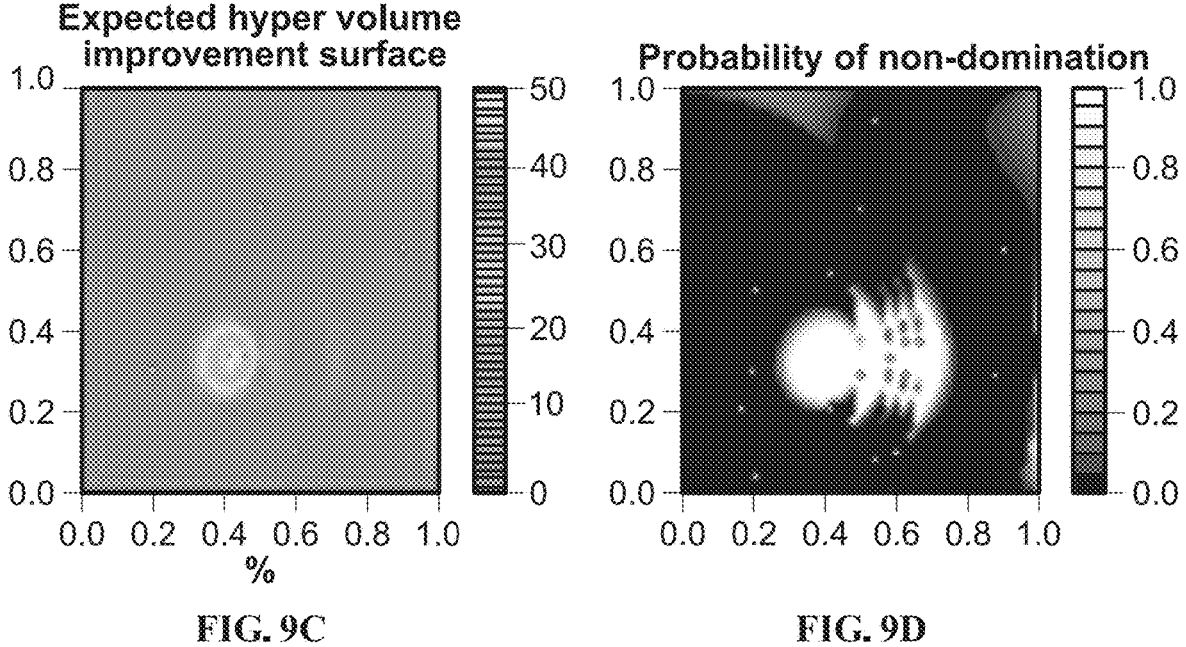
FIG. 9C
FIG. 9D

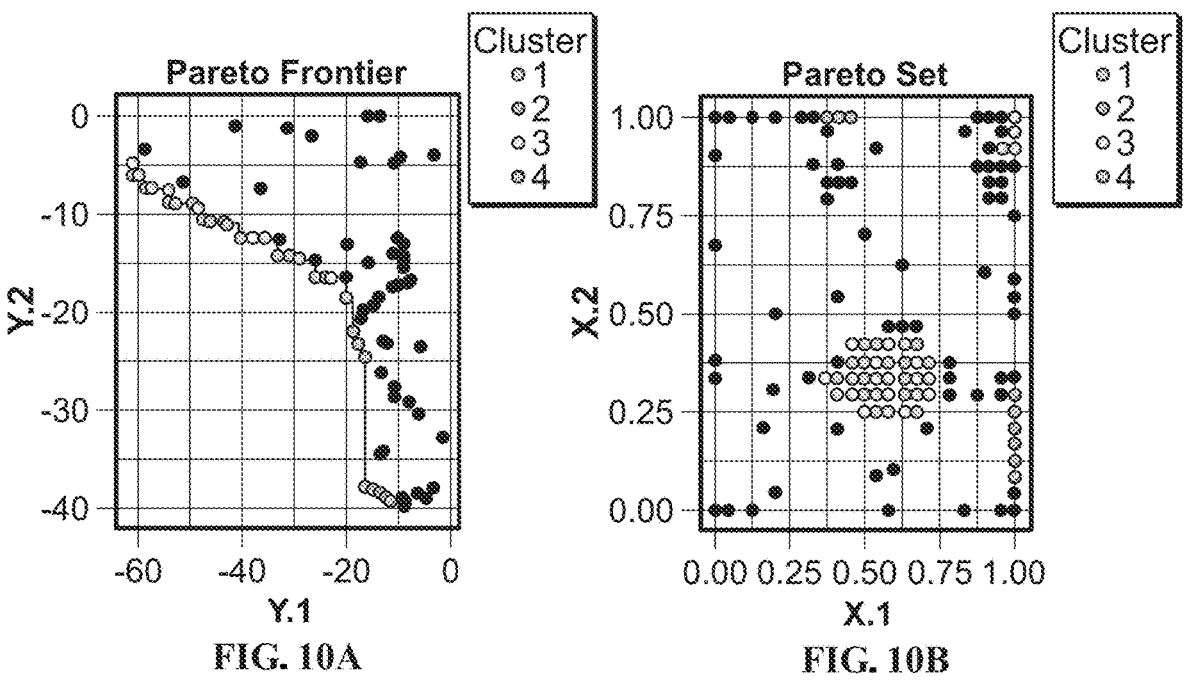
FIG. 10A          FIG. 10B
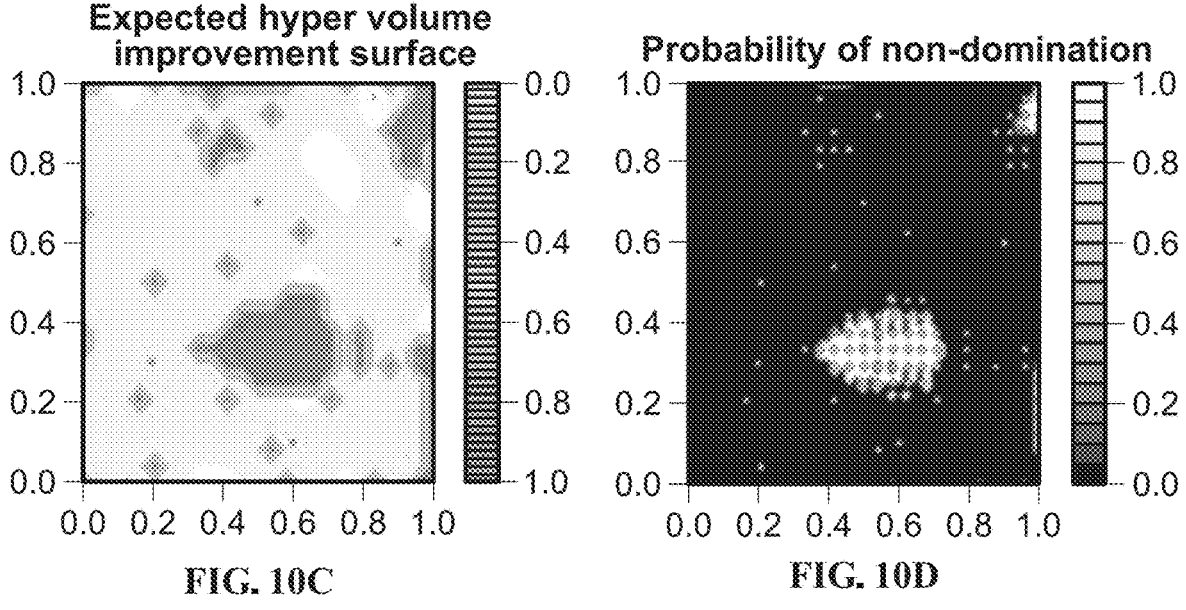
FIG. 10C          FIG. 10D

METHODS AND MECHANISMS FOR PROCESS RECIPE OPTIMIZATION

RELATED APPLICATIONS

This application claims the benefit of U.S. Provisional Application No. 63/274,705, filed Nov. 2, 2021, the entire contents of which is hereby incorporated by reference herein

TECHNICAL FIELD

The present disclosure relates to electrical components, and, more particularly, to methods and mechanisms for process recipe optimization, such as for etch patterning optimization.

BACKGROUND

Products can be produced by performing one or more manufacturing processes using manufacturing equipment. For example, semiconductor manufacturing equipment can be used to produce semiconductor devices (e.g., substrates) via semiconductor manufacturing processes. The manufacturing equipment can, according to a process recipe, deposit multiple layers of film on the surface of the substrate and can perform an etch process to form the intricate pattern in the deposited film. For example, the manufacturing equipment can perform a chemical vapor deposition (CVD) process to deposit alternative layers on the substrate. Etch process equipment can then be used to remove material from areas of a substrate through, e.g., chemical reaction and/or physical bombardment.

A typical substrate processing method has multiple different processes, with some advanced methods (e.g., plasma etching) having twenty or even more processes. Each process has a multitude of process control variables, also referred to as "knobs," that can be used to tune and optimize performance. Therefore, the space available to tune and optimize a given process is theoretically extremely large.

Process engineers use their experience and expertise to select a preliminary baseline process and fine-tune the process based on a limited number of substrates (or portions of substrates, referred to as coupons) dedicated for design of experiment (DoE). The goal of DoE is to tailor the process to achieve desired specification on a substrate. However, dedicating full substrates or portions of substrate for DoE data collection consume valuable resources. Therefore, often the adopted process may be a viable one, but not necessarily the optimum solution.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, an electronic device manufacturing system is configured to perform a first process on a first substrate according to a process recipe. The process recipe comprises a plurality of setting parameters, wherein the first process generates a plurality of features on a surface of the first substrate. The electronic device manufacturing system then generate metrology data associated with the plurality of features and inputs the metrology data into one or more Bayesian probabilistic models. The electronic device manufacturing system then receives an output from the one or more Bayesian probabilistic models, wherein the one or more Bayesian probabilistic models generate the output based on the metrology data and at least one settings parameter of the plurality of setting parameters. The electronic device manufacturing system then updates, based on the output of the one or more Bayesian probabilistic models, the process recipe by modifying at least one setting parameter of the plurality of setting parameters and performs a second process on a second substrate according to the updated process recipe.

A further aspect of the disclosure includes a method according to any aspect or embodiment described herein.

A further aspect of the disclosure includes a non-transitory computer-readable storage medium comprising instructions that, when executed by a processing device operatively coupled to a memory, performs operations according to any aspect or embodiment described herein.

BRIEF DESCRIPTION OF THE DRAWINGS

The present disclosure is illustrated by way of example, and not by way of limitation in the figures of the accompanying drawings.

FIG. 3 is a top schematic view of an example manufacturing system, according to certain embodiments.

FIG. 4 is a cross-sectional schematic side view of an example process chamber of the example manufacturing system, according to certain embodiments.

FIG. 6 is a flow diagram of a method for modifying a process recipe using a machine-learning model, according to certain embodiments.

FIGS. 8A-8B illustrate graphs showings the Pareto Frontier and the Pareto Set of an initial population epoch, according to certain embodiments.

FIGS. 8C-8D illustrate probability graphs of a correlation between one or more features and one or more settings parameters associated with FIGS. 8A-8B, according to certain embodiments.

FIGS. 9A-9B illustrate graphs showings the Pareto Frontier and the Pareto Set of a middle population epoch, according to certain embodiments.

FIGS. 9C-9D illustrate probability graphs of a correlation between one or more features and one or more settings parameters associated with FIGS. 9A-9B, according to certain embodiments FIGS. 10A-10B illustrate graphs showings the Pareto Frontier and the Pareto Set of a final population epoch, according to certain embodiments.

FIGS. 10C-10D illustrate probability graphs of a correlation between one or more features and one or more settings parameters associated with FIGS. 10A-10B, according to certain embodiments.

DETAILED DESCRIPTION

Described herein are technologies directed to methods and mechanisms for etch patterning optimization. In substrate manufacturing, a film can be deposited on a surface of a substrate during a deposition process (e.g., a deposition (CVD) process, an atomic layer deposition (ALD) process, and so forth) performed at a process chamber of a manufacturing system. For example, in a CVD process, the substrate is exposed to one or more precursors, which react on the substrate surface to produce the desired deposit. The film can include one or more layers of materials that are formed during the deposition process, and each layer can include a particular thickness gradient (e.g., changes in the thickness along a layer of the deposited film). For example, a first layer can be formed directly on the surface of the substrate (referred to as a proximal layer or proximal end of the film) and have a first thickness. After the first layer is formed on the surface of the substrate, a second layer having a second thickness can be formed on the first layer. This process continues until the deposition process is completed and a final layer is formed for the film (referred to as the distal layer or distal end of the film). The film can include alternating layers of different materials. For example, the film can include alternating layers of oxide and nitride layers (oxide-nitride-oxide-nitride stack or ONON stack), alternating oxide and polysilicon layers (oxide-polysilicon-oxide-polysilicon stack or OPOP stack), and so forth.

The film can be subjected to, for example, an etch process to form a pattern on the surface of the substrate, a chemical-mechanical polishing (CMP) process to smooth the surface of the film, or any other process necessary to manufacture the finished substrate. An etch process can include exposing highly energetic process gas (e.g., a plasma) with a sample surface to break down the materials at the surface, which can then be removed by a vacuum system.

Figures 5A, 5B:
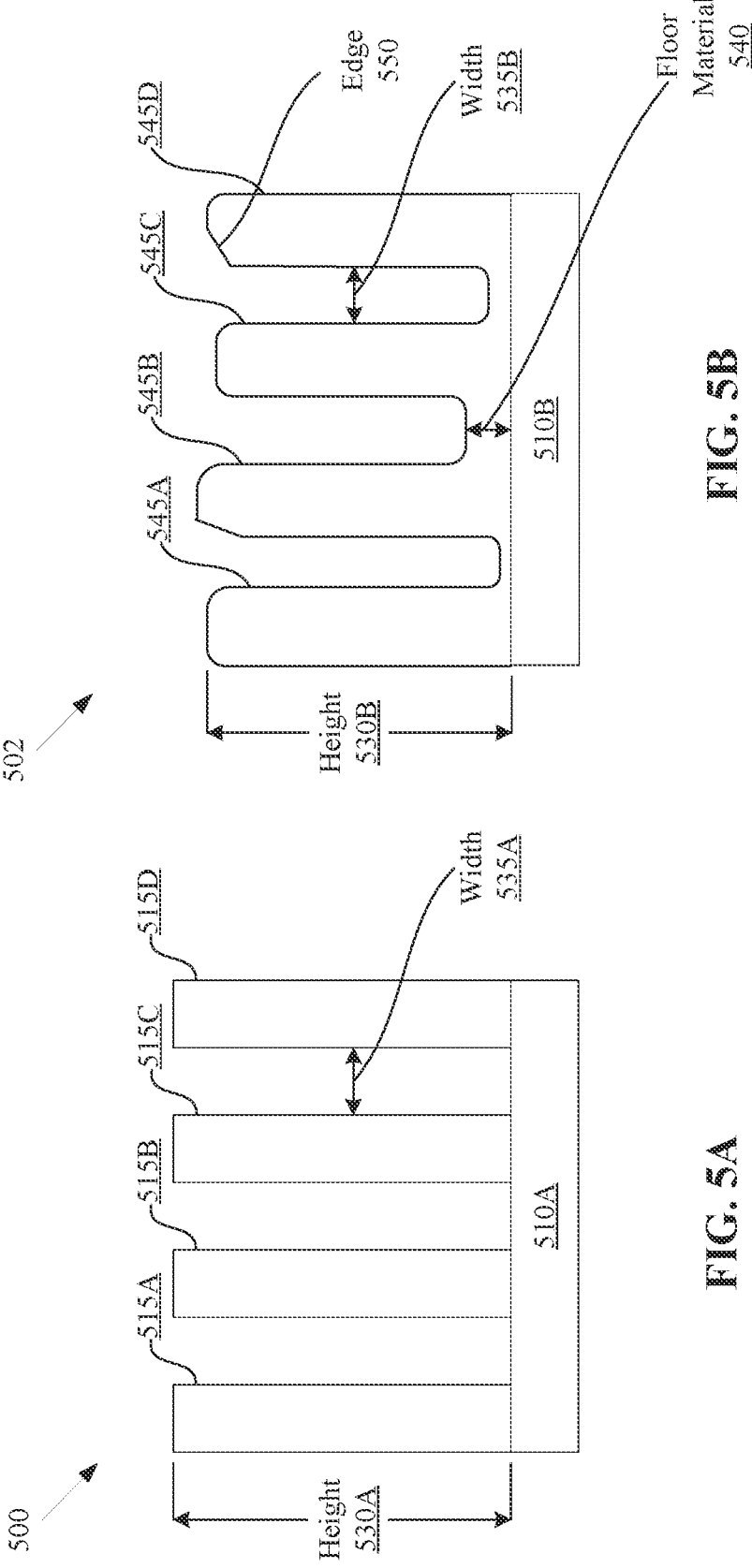
FIGS. 5A-5B are illustrations showing an ideal mandrel set and a flawed mandrel set, according to certain embodiments.

In some pattern designs (e.g., spacer patterning), the etch process can form a set of nanometric structures referred to as mandrels. FIGS. 5A-5B are illustrations showing an ideal mandrel set 500 and a flawed mandrel set 502, respectively. In particular, FIGS. 5A-5B each show a substrate 510 with four mandrels (515A-D in FIG. 5A, and 545A-D in FIG. 5B). In the ideal mandrel set 500, the height 530A of each mandrel 515A-D is uniform and equal to desired target height, the width 535 (spacing) between mandrels is uniform and equal to desired target width, the edges of each mandrel are angled, and there is no extra material attached to the substrate between each pair of mandrels. In the flawed mandrel set 502, the height 530B of each mandrel 545A-D varies and is shorter than the target height, the width 535B between each pair of mandrels 545A-D varies and is different from the target width, there is floor material remaining that the etch process failed to remove, the edge 550 of each mandrel may be deformed or curved (top edge roughness), the bottom edges may be deformed or curved (bottom edge roughness), etc. These deviations from the target structures can lead to the fabrication of inconsistent, abnormal, and/or defective products.

A flawed mandrel set 502 may be formed by processing substrates using an etch process recipe that has not been properly tuned. Similarly, improperly tuned etch process recipes may result in other manufacturing flaws, such as critical dimensions (CDs) that are outside of specification, inconsistent thicknesses of one or more layers on the substrate, and so on. Similarly, processing substrates using other types of processes (e.g., deposition processes, cleaning processes, etc.) that have not been properly designed may also result in substrates having flawed features. Accordingly, process engineers often perform designs of experiments (DoEs) to tune process recipes. However, performance of DoEs may consume considerable time and resources.

Aspects and implementations of the present disclosure address these and other shortcomings of the existing technology by using feature models to optimize settings related to generating etch patterns and other features resultant from etch processes and/or other processes. In particular, the system of the present disclosure can generate a set of feature models, each of which can be a Bayesian probabilistic model. Each individual feature model can model the actual and/or predictive correlations of a particular set of features. For example, each feature model can model the correlation between a recipe setting (e.g., pressure, temperature, etc.) and certain metrology data (e.g., property data of a mandrel, such as, mandrel height, mandrel width, etc.). The output of each model and a set of target properties (e.g., the target properties of, for example, each mandrel) can be input into an optimizer component configured to output a Pareto frontier that includes at least one set of Pareto efficient manufacturing settings (or parameters). A Pareto front is a set of Pareto efficient solutions in which no objective can be improved without sacrificing at least one other objective. That is, the Pareto front includes non-dominated solutions. Using the Pareto front, one or more new manufacturing settings values can be selected and used to update the process recipe. The new process recipe can then be used to perform the manufacturing process on a new substrate. This process can be continuously repeated to further optimize the process recipe by updating the feature models using the new settings data and new metrology data from each new substrate. Accordingly, in embodiments the system and method described herein can improve the efficiency of DoEs by indicating which parameters to modify for future experiments and/or how to modify those parameters for the future experiments.

Aspects of the present disclosure result in technological advantages of significant reduction in time and data used to adjust the parameters of a process recipe. In particular, aspects of the present disclosure enable a predictive system to provide recipe settings that improve the nanometer structures generated by an etch process and/or other process such as an ALD process, CVD process, other deposition process, and so on. This allows the engineers to better refine the process recipe while consuming less valuable resources. The present disclosure can also result in avoiding the fabrication of inconsistent and abnormal products.

Figure 1:
FIG. 1 is a block diagram illustrating an exemplary system architecture, according to certain embodiments.

FIG. 1 depicts an illustrative computer system architecture 100, according to aspects of the present disclosure. In some embodiments, computer system architecture 100 can be included as part of a manufacturing system for processing substrates, such as manufacturing system 300 of FIG. 3. Computer system architecture 100 includes a client device 120, manufacturing equipment 124, metrology equipment 128, a predictive server 112 (e.g., to generate predictive data, to provide model adaptation, to use a knowledge base, etc.), and a data store 140. The predictive server 112 can be part of a predictive system 110. The predictive system 110 can further include server machines 170 and 180. The manufacturing equipment 124 can include sensors 126 configured to capture data for a substrate being processed at the manufacturing system. In some embodiments, the manufacturing equipment 124 and sensors 126 can be part of a sensor system that includes a sensor server (e.g., field service server (FSS) at a manufacturing facility) and sensor identifier reader (e.g., front opening unified pod (FOUP) radio frequency identification (RFID) reader for sensor system). In some embodiments, metrology equipment 128 can be part of a metrology system that includes a metrology server (e.g., a metrology database, metrology folders, etc.) and metrology identifier reader (e.g., FOUP RFID reader for metrology system).

Manufacturing equipment 124 can produce products, such as electronic devices, following a recipe or performing runs over a period of time. Manufacturing equipment 124 can include a process chamber, such as process chamber 400 described with respect to FIG. 4. Manufacturing equipment 124 can perform a process for a substrate (e.g., a wafer, etc.) at the process chamber. Examples of substrate processes include a deposition process to deposit one or more layers of film on a surface of the substrate, an etch process to form a pattern on the surface of the substrate, etc. Manufacturing equipment 124 can perform each process according to a process recipe. A process recipe defines a particular set of operations to be performed for the substrate during the process and can include one or more settings associated with each operation. For example, a deposition process recipe can include a temperature setting for the process chamber, a pressure setting for the process chamber, a flow rate setting for a precursor for a material included in the film deposited on the substrate surface, etc.

In some embodiments, manufacturing equipment 124 includes sensors 126 that are configured to generate data associated with a substrate processed at manufacturing system 100. For example, a process chamber can include one or more sensors configured to generate spectral or non-spectral data associated with the substrate before, during, and/or after a process (e.g., a deposition process) is performed for the substrate.

In some embodiments, sensors 126 provide sensor data (e.g., sensor values, features, trace data) associated with manufacturing equipment 124 (e.g., associated with producing, by manufacturing equipment 124, corresponding products, such as substrates). The manufacturing equipment 124 may produce products following a recipe or by performing runs over a period of time. Sensor data received over a period of time (e.g., corresponding to at least part of a recipe or run) may be referred to as trace data (e.g., historical trace data, current trace data, etc.) received from different sensors 126 over time. Sensor data can include a value of one or more of temperature (e.g., heater temperature), spacing (SP), pressure, high frequency radio frequency (HFRF), voltage of electrostatic chuck (ESC), electrical current, material flow, power, voltage, etc. Sensor data can be associated with or indicative of manufacturing parameters such as hardware parameters, such as settings or components (e.g., size, type, etc.) of the manufacturing equipment 124, or process parameters of the manufacturing equipment 124. The sensor data can be provided while the manufacturing equipment 124 is performing manufacturing processes (e.g., equipment readings when processing products). The sensor data can be different for each substrate.

Metrology equipment 128 can provide metrology data associated with substrates processed by manufacturing equipment 124 in association with process recipes. The metrology data can include a value of film property data (e.g., wafer spatial film properties), dimensions (e.g., thickness, height, etc.), dielectric constant, dopant concentration, density, defects, etc. In some embodiments, the metrology data can further include a value of one or more surface profile property data (e.g., an etch rate, an etch rate uniformity, a critical dimension of one or more features included on a surface of the substrate, a critical dimension uniformity across the surface of the substrate, an edge placement error, etc.). The metrology data can be of a finished or semi-finished product. The metrology data can be different for each substrate. Metrology data can be generated using, for example, reflectometry techniques, ellipsometry techniques, TEM techniques, and so forth.

In some embodiments, metrology equipment 128 can be included as part of the manufacturing equipment 124. For example, metrology equipment 128 can be included inside of or coupled to a process chamber and configured to generate metrology data for a substrate before, during, and/or after a process (e.g., a deposition process, an etch process, etc.) while the substrate remains in the process chamber. In such instances, metrology equipment 128 can be referred to as in-situ metrology equipment. In another example, metrology equipment 128 can be coupled to another station of manufacturing equipment 124. For example, metrology equipment can be coupled to a transfer chamber, such as transfer chamber 310 of FIG. 3, a load lock, such as load lock 320, or a factory interface, such as factory interface 306. In such instances, metrology equipment 128 can be referred to as integrated metrology equipment. In other or similar embodiments, metrology equipment 128 is not coupled to a station of manufacturing equipment 124. In such instances, metrology equipment 128 can be referred to as inline metrology equipment or external metrology equipment. In some embodiments, integrated metrology equipment and/or inline metrology equipment are configured to generate metrology data for a substrate before and/or after a process.

The client device 120 may include a computing device such as personal computers (PCs), laptops, mobile phones, smart phones, tablet computers, netbook computers, network connected televisions ("smart TVs"), network-connected media players (e.g., Blu-ray player), a set-top box, over-the-top (OTT) streaming devices, operator boxes, etc. In some embodiments, the metrology data can be received from the client device 120. Client device 120 can display a graphical user interface (GUI), where the GUI enables the user to provide, as input, metrology measurement values for substrates processed at the manufacturing system. The client device 120 can include a corrective action component 122. Corrective action component 122 can receive user input (e.g., via a Graphical User Interface (GUI) displayed via the client device 120) of an indication associated with manufacturing equipment 124. In some embodiments, the corrective action component 122 transmits the indication to the predictive system 110, receives output (e.g., predictive data) from the predictive system 110, determines a corrective action based on the output, and causes the corrective action to be implemented. In some embodiments, the corrective action component 122 receives an indication of a corrective action from the predictive system 110 and causes the corrective action to be implemented. In some embodiments, the corrective action can be an adjustment to one or more settings of a process recipe. Each client device 120 may include an operating system that allows users to one or more of generate, view, or edit data (e.g., indication associated with manufacturing equipment 124, corrective actions associated with manufacturing equipment 124, etc.).

Data store 140 can be a memory (e.g., random access memory), a drive (e.g., a hard drive, a flash drive), a database system, or another type of component or device capable of storing data. Data store 140 can include multiple storage components (e.g., multiple drives or multiple databases) that can span multiple computing devices (e.g., multiple server computers). The data store 140 can store data associated with processing a substrate at manufacturing equipment 124. For example, data store 140 can store data collected by sensors 126 at manufacturing equipment 124 before, during, or after a substrate process (referred to as process data). Process data can refer to historical process data (e.g., process data generated for a prior substrate processed at the manufacturing system) and/or current process data (e.g., process data generated for a current substrate processed at the manufacturing system). Data store can also store spectral data or non-spectral data associated with a portion of a substrate processed at manufacturing equipment 124. Spectral data can include historical spectral data and/or current spectral data.

The data store 140 can also store contextual data associated with one or more substrates processed at the manufacturing system. Contextual data can include a recipe name, recipe step number, preventive maintenance indicator, operator, etc. Contextual data can refer to historical contextual data (e.g., contextual data associated with a prior process performed for a prior substrate) and/or current process data (e.g., contextual data associated with current process or a future process to be performed for a prior substrate). The contextual data can further include identify sensors that are associated with a particular sub-system of a process chamber.

The data store 140 can also store task data. Task data can include one or more sets of operations to be performed for the substrate during a deposition process and can include one or more settings associated with each operation. For example, task data for a deposition process can include a temperature setting for a process chamber, a pressure setting for a process chamber, a flow rate setting for a precursor for a material of a film deposited on a substrate, etc. In another example, task data can include controlling pressure at a defined pressure point for the flow value. Task data can refer to historical task data (e.g., task data associated with a prior process performed for a prior substrate) and/or current task data (e.g., task data associated with current process or a future process to be performed for a substrate).

In some embodiments, data store 140 can also store metrology data. In some embodiments, the metrology data can include property data associated with a deposition process. For example, the metrology data can include film thickness data (e.g., a film thickness profile) associated with one or more film layers. A film thickness profile refers to a particular thickness gradient of deposited film (e.g., changes in the thickness along a layer of deposited film). In some embodiments, the film thickness profile can include a thickness value of a film stack (e.g., multiple layers of one or more materials) deposited on a surface of a substrate (e.g., as determined by metrology inspection or as determined by prediction using, for example, a physics engine). In some embodiments, the metrology data can include property data associated with an etch process. For example, the metrology data can include measurement data associated with one or more nanometric structures (e.g., mandrels). The measurement data can include mandrel height, width, spacing distance, edge deformations, floor material thickness, etc.

In some embodiments, data store 140 can be configured to store data that is not accessible to a user of the manufacturing system. For example, process data, spectral data, contextual data, etc. obtained for a substrate being processed at the manufacturing system is not accessible to a user (e.g., an operator) of the manufacturing system. In some embodiments, all data stored at data store 140 can be inaccessible by the user of the manufacturing system. In other or similar embodiments, a portion of data stored at data store 140 can be inaccessible by the user while another portion of data stored at data store 140 can be accessible by the user. In some embodiments, one or more portions of data stored at data store 140 can be encrypted using an encryption mechanism that is unknown to the user (e.g., data is encrypted using a private encryption key). In other or similar embodiments, data store 140 can include multiple data stores where data that is inaccessible to the user is stored in one or more first data stores and data that is accessible to the user is stored in one or more second data stores.

In some embodiments, predictive system 110 includes predictive server 112, server machine 170 and server machine 180. The predictive server 112, server machine 170, and server machine 180 may each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

Server machine 170 includes a training set generator 172 that is capable of generating training data sets (e.g., a set of data inputs and a set of target outputs) to train, validate, and/or test a machine-learning model 190 (e.g., a feature model). Machine-learning model 190 can be any algorithmic model capable of learning from data. In some embodiments, the data set generator 172 can partition the training data into a training set, a validating set, and a testing set. In some embodiments, the predictive system 110 generates multiple sets of training data.

Server machine 180 can include a training engine 182, a validation engine 184, a selection engine 185, and/or a testing engine 186. An engine can refer to hardware (e.g., circuitry, dedicated logic, programmable logic, microcode, processing device, etc.), software (such as instructions run on a processing device, a general purpose computer system, or a dedicated machine), firmware, microcode, or a combination thereof. Training engine 182 can be capable of training one or more machine-learning models 190. Machine-learning model 190 can refer to the model artifact that is created by the training engine 182 using the training data (also referred to herein as a training set) that includes training inputs and corresponding target outputs (correct answers for respective training inputs). The training engine 182 can find patterns in the training data that map the training input to the target output (the answer to be predicted), and provide the machine-learning model 190 that captures these patterns. The machine-learning model 190 can use one or more of a statistical modelling, support vector machine (SVM), Radial Basis Function (RBF), clustering, supervised machine-learning, semi-supervised machine-learning, unsupervised machine-learning, k-nearest neighbor algorithm (k-NN), linear regression, random forest, neural network (e.g., artificial neural network), Bayesian probabilistic modeling, Bayesian machine learning model, etc.

One type of machine learning model that may be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In a plasma process tuning, for example, the raw input may be process result profiles (e.g., thickness profiles indicative of one or more thickness values across a surface of a substrate); the second layer may compose feature data associated with a status of one or more zones of controlled elements of a plasma process system (e.g., orientation of zones, plasma exposure duration, etc.); the third layer may include a starting recipe (e.g., a recipe used as a starting point for determining an updated process recipe the process a substrate to generate a process result the meets threshold criteria). Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one embodiment, one or more machine-learning models is a recurrent neural network (RNN). An RNN is a type of neural network that includes a memory to enable the neural network to capture temporal dependencies. An RNN is able to learn input-output mappings that depend on both a current input and past inputs. The RNN will address past and future flow rate measurements and make predictions based on this continuous metrology information. RNNs may be trained using a training dataset to generate a fixed number of outputs (e.g., to determine a set of substrate processing rates, determine modification to a substrate process recipe). One type of RNN that may be used is a long short term memory (LSTM) neural network.

In one embodiment, one or more machine-learning models may be or use one or more probabilistic models. In some embodiments, server machine 180 can generate the probabilistic model using one or more operations including pre-processing input data (e.g., sensor data, metrology data, parameter data, settings data, etc.) to generate statistics data (or obtain statistics data from data store 140, manufacturing equipment 124, metrology equipment 128, etc.), reduce the dimensionality of the input data or statistics data, process the reduced representations by one or more statistical methods or models, normalize the data, and/or process the data using one or more models. At least some of the listed operations can include machine learning. In some embodiments, the server machine 180 can use Bayesian optimization. Bayesian optimization is a sequential design strategy for global optimization of black-box functions that does not assume any functional forms. It can be employed to optimize expensive-to-evaluate functions. In embodiments, a Bayesian probabilistic method is performed. For the Bayesian probabilistic method, Gaussian process surrogates are generated for each of multiple objectives. The Gaussian process surrogates may be based on expectations plus probability distributions in embodiments.

Training of machine learning models may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset. Training of machine learning models may also be achieved in an unsupervised learning manner in embodiments.

A training dataset containing hundreds, thousands, tens of thousands, hundreds of thousands or more sensor data and/or process result data (e.g., metrology data such as one or more thickness profiles associated with the sensor data) may be used to form a training dataset.

To effectuate training, processing logic may input the training dataset(s) into one or more untrained machine learning models. Prior to inputting a first input into a machine learning model, the machine learning model may be initialized. Processing logic trains the untrained machine learning model(s) based on the training dataset(s) to generate one or more trained machine learning models that perform various operations as set forth above. Training may be performed by inputting one or more of the data from the training dataset into the machine learning model one at a time.

The machine learning model processes the input to generate an output. An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction and/or output that the machine learning model can produce.

Accordingly, the output may include one or more predictions or inferences. For example, an output prediction or inference may include one or more predictions of film buildup on chamber components, erosion of chamber components, predicted failure of chamber components, and so on. Processing logic determines an error (i.e., a classification error) based on the differences between the output (e.g., predictions or inferences) of the machine learning model and target labels associated with the input training data. Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criterion is met if accuracy of the machine learning model has stopped improving. If the stopping criterion has not been met, further training is performed. If the stopping criterion has been met, training may be complete. Once the machine learning model is trained, a reserved portion of the training dataset may be used to test the model.

Once one or more models 190 (e.g., trained machine learning models and/or Bayesian models) are generated, they may be stored in predictive server 112 as predictive component 114 or as a component of predictive component 114.

The validation engine 184 can be capable of validating machine-learning model 190 using a corresponding set of features of a validation set from training set generator 172. Once the model parameters have been optimized, model validation may be performed to determine whether the model has improved and to determine a current accuracy of the deep learning model. The validation engine 184 can determine an accuracy of machine-learning model 190 based on the corresponding sets of features of the validation set. The validation engine 184 can discard a model 190 that has an accuracy that does not meet a threshold accuracy. In some embodiments, the selection engine 185 can be capable of selecting a model 190 that has an accuracy that meets a threshold accuracy. In some embodiments, the selection engine 185 can be capable of selecting the trained machine-learning model 190 that has the highest accuracy of the trained machine-learning models 190.

The testing engine 186 can be capable of testing a model 190 using a corresponding set of features of a testing set from data set generator 172. For example, a first model 190 that was trained using a first set of features of the training set can be tested using the first set of features of the testing set. The testing engine 186 can determine a model 190 that has the highest accuracy of all of the trained machine-learning models based on the testing sets.

As described in detail below, predictive server 112 includes a predictive component 114 that is capable of providing predictive data indicative of optimization parameters relating to a process recipe, such as for a plasma etch process. The predictive server 112 may run a model 190 (e.g., a Bayesian model) on the current data input to obtain one or more outputs. This will be explained in further detail below.

The client device 120, manufacturing equipment 124, sensors 126, metrology equipment 128, predictive server 112, data store 140, server machine 170, and server machine 180 can be coupled to each other via a network 130. In some embodiments, network 130 is a public network that provides client device 120 with access to predictive server 112, data store 140, and other publically available computing devices. In some embodiments, network 130 is a private network that provides client device 120 access to manufacturing equipment 124, metrology equipment 128, data store 140, and other privately available computing devices. Network 130 can include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

It should be noted that in some other implementations, the functions of server machines 170 and 180, as well as predictive server 112, can be provided by a fewer number of machines. For example, in some embodiments, server machines 170 and 180 can be integrated into a single machine, while in some other or similar embodiments, server machines 170 and 180, as well as predictive server 112, can be integrated into a single machine.

In general, functions described in one implementation as being performed by server machine 170, server machine 180, and/or predictive server 112 can also be performed on client device 120. In addition, the functionality attributed to a particular component can be performed by different or multiple components operating together.

In embodiments, a "user" can be represented as a single individual. However, other embodiments of the disclosure encompass a "user" being an entity controlled by a plurality of users and/or an automated source. For example, a set of individual users federated as a group of administrators can be considered a "user."

Figure 2A:
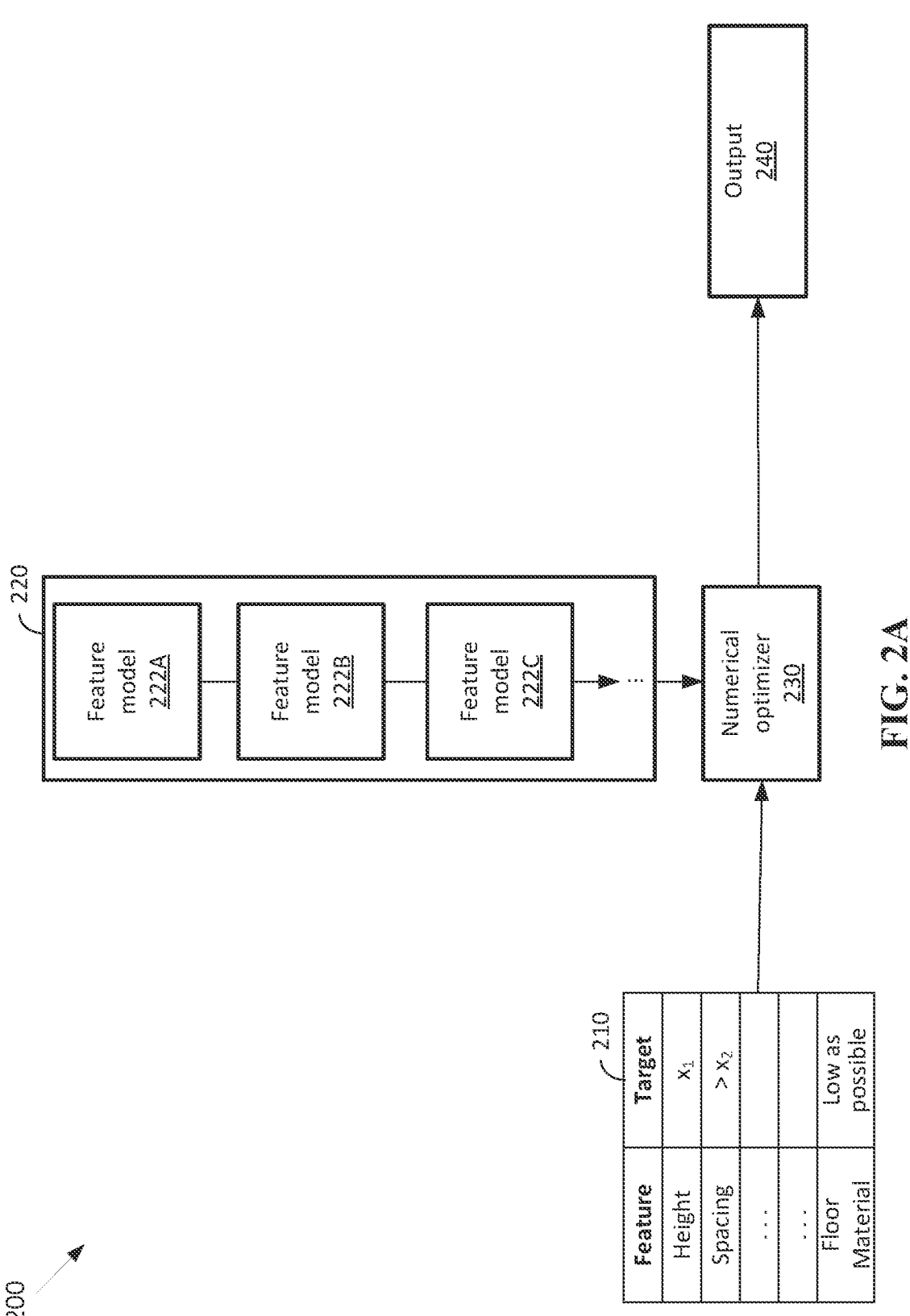
FIG. 2A is a diagram of a system for Pareto frontier based on output from a set of feature models, according to certain embodiments.

FIG. 2A is a diagram of a system 200 for generating a Pareto frontier based on output from a set of feature models, according to aspects of the present disclosure. The Pareto frontier may be a multi-objective Pareto frontier in embodiments. As shown, a set of target properties 210 and a set of feature models 220 are received by a numerical optimizer component 230. The set of target properties 210 can be received as input from a user. The set of target properties 210 can include multiple features and respective targets for each feature, where each target corresponds to an expected or target value or range of values for its corresponding feature. A feature can include data relating to a substrate property associated with a manufacturing process (e.g., mandrel height, film thickness, spacing, etc.) Examples of targets include specific values, "mean," "less than," "greater than," "as low as possible," etc. In this illustrative example, the set of target properties 210 specifies a mandrel height feature having a corresponding target of an expected or target value of $x_1$, mandrel spacing having a corresponding target of "greater than" and a value of $x_2$ (i.e., the goal for spacing is a value greater than $x_2$), and a floor material having a corresponding target of "low as possible" (i.e., as close to zero as possible).

The set of feature models 220 is shown including a number of feature models. In some embodiments, the set of feature models can be generated by predictive system 110. In some implementations, the set of feature models 220 includes a set of Bayesian probabilistic models. Each individual feature model can model a particular set of features. For example, Bayesian probabilistic model 222A can model the actual and/or predictive correlations between mandrel height and process chamber pressure, Bayesian probabilistic model 222B can model the actual and/or predictive correlations between mandrel spacing and plasma temperature, Bayesian probabilistic model 222C can model the actual and/or predictive correlations between floor material and plasma temperature, etc. Input of a feature model can include manufacturing parameters (e.g., process parameters, hardware parameters), metrology data, target property data, etc. Output of a feature model can include a probabilistic function showing the correlation of two or more features.

Figures 2B, 2C, 2D:
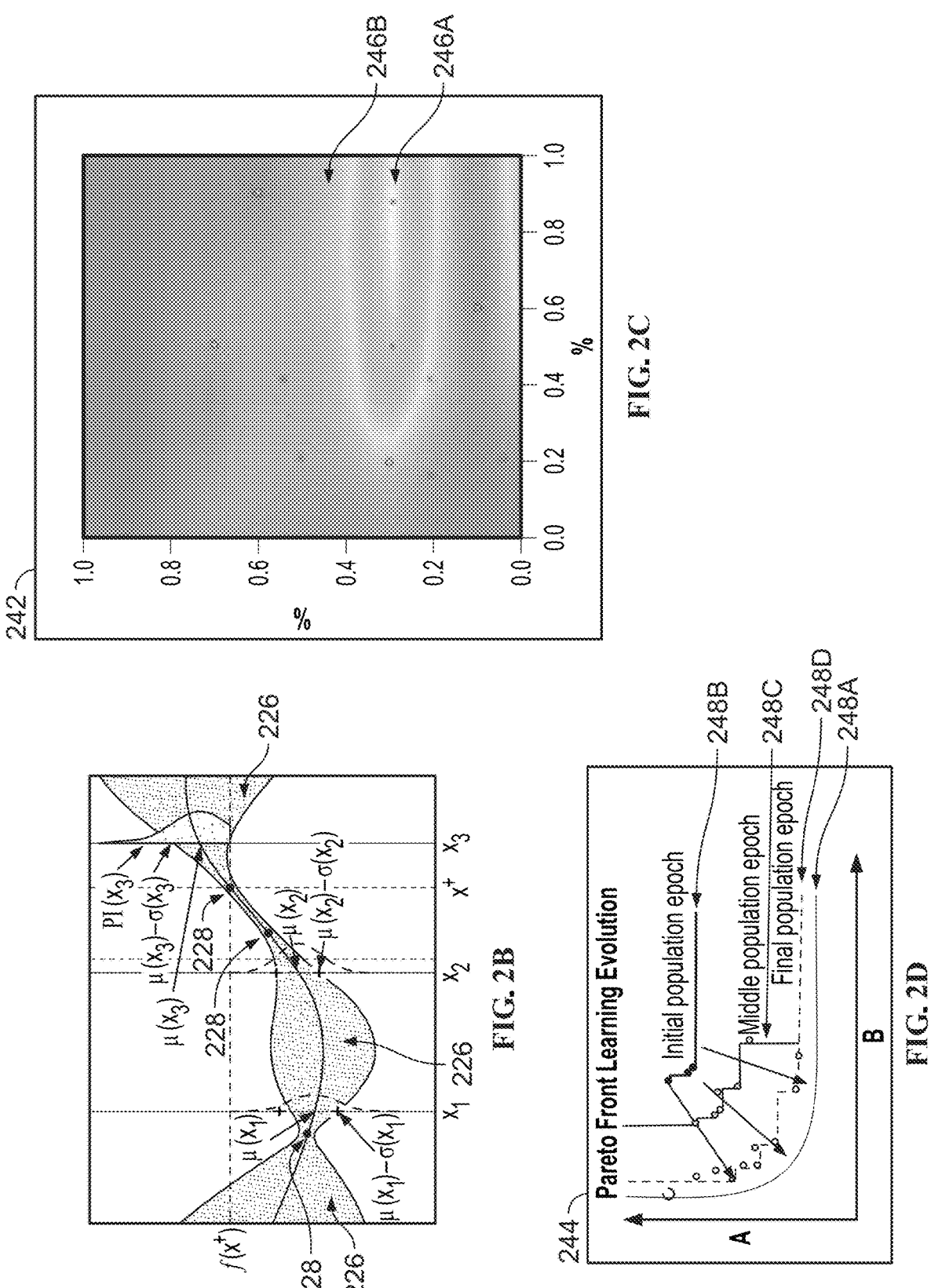
FIG. 2B is a graph of an example illustration generated by a feature model, according to certain embodiments.
FIG. 2C is a graph of an illustration of an example probability graph, according to certain embodiments.
FIG. 2D is a graph of an illustration of an example Pareto front learning evolution, according to certain embodiments.

FIG. 2B shows graph 224, which is an example illustration generated by feature model 222A. In particular, graph 224 shows a Bayesian probabilistic distribution reflecting the mandrel height (y-axis) to the process chamber pressure (x-axis). Points 226 indicate actual correlations between the mandrel height and the pressure. Shading 228 shows the predictive correlations between the mandrel height and the process chamber pressure.

In some implementations, a design of experiment (DoE) technique is used to generate the set of feature models 220. DoE techniques can be used to determine substrate characteristics (e.g., mandrel characteristics) in view of changing recipe parameters (e.g., settings data). DoE is the design of any information-gathering exercise where variation is present. DoE analysis is the analysis of data generated from execution of a DoE (i.e., DoE data). In some implementations, DOE data includes recipe parameters, recipe parameter values, and metrology data (e.g., substrate measurements, mandrel measurements, layer measurements, etc.). For example, for a DoE analysis in which five recipe parameters may be varied, a DoE can be performed by running multiple experiments where each of the five recipe parameters is varied according to predetermined values for each experiment. Substrates from each experiment may then be measured at various locations and associated with their corresponding recipe parameters.

As will be described in further detail below, each feature model of the set of feature models 220 can be used to generate actual and/or predictive correlations based on the set of target properties 210 by capturing spatial relationships among corresponding features and/or recipe settings. To do this, the set of feature models 220 can be provided to the numerical optimizer component 230. In some embodiments, the numerical optimizer component 230 executes numerical search and optimization routines to generate an output in view of the set of feature models 220 and the set of target properties 210. In some implementations, the output of the numerical optimizer component 230 can include, or can be used to generate, predictive data, such as, for example, a probability graph 242, shown in FIG. 2C. The probability graph 242 can indicate a likely correlation between one or more features and one or more settings parameters. In some embodiments, the probability graph can be a heat map. For example, area 246A can indicate a high probability of a correlation between the feature value and the setting value, while area 246B can indicate a low probability of a correlation between the feature value and the setting value. In some embodiments, the numerical optimizer is a component of predictive component 114.

Ideally, a set of manufacturing parameters (or recipe parameters) will simultaneously satisfy each target property of the set of target properties 210. However, it may be the case that the numerical optimizer component 230 cannot generate manufacturing or recipe solutions that simultaneously satisfy each target property of the set of target properties 210. For example, the numerical optimizer component 230 may find sets of manufacturing parameters that are predicted to satisfy targets for at least one feature (at least one satisfied feature), but at the expense of the target of at least one other feature (at least one non-satisfied feature). In such cases, the output generated by the numerical optimizer component 230 can be a Pareto frontier or front including at least one set of Pareto efficient manufacturing settings (or parameters). Generally, a Pareto front is a set of Pareto efficient solutions in which no objective can be improved without sacrificing at least one other objective. That is, the Pareto front includes non-dominated solutions. Additionally or alternatively, the output can include solutions that achieve the target for, say, a non-satisfied feature, and an estimated tradeoff with respect to the satisfied feature(s) can be observed. This can be particularly useful in cases where it may be important to ensure that a feature determined to be non-satisfied by the numerical optimizer component 230 can be satisfied by the recipe. FIG. 2D shows graph 224, which illustrates an example Pareto front learning evolution. Curve 248A indicates the desired correlation between two property features, e.g., mandrel height (y-axis) and mandrel width (x-axis). Curve 248B illustrates the correlations during a first set of process runs. As the process recipe is adjusted (e.g., using new setting values obtained from the output 240, such as graph 242, which will be discussed in FIG. 6), the recipe can be optimized to move the property features towards line 248A (as shown via curves 248C and 248D). For example, the new settings values can be selected, based on, for example, which values are closest to the optimal Pareto front curve 248A.

Figure 3:
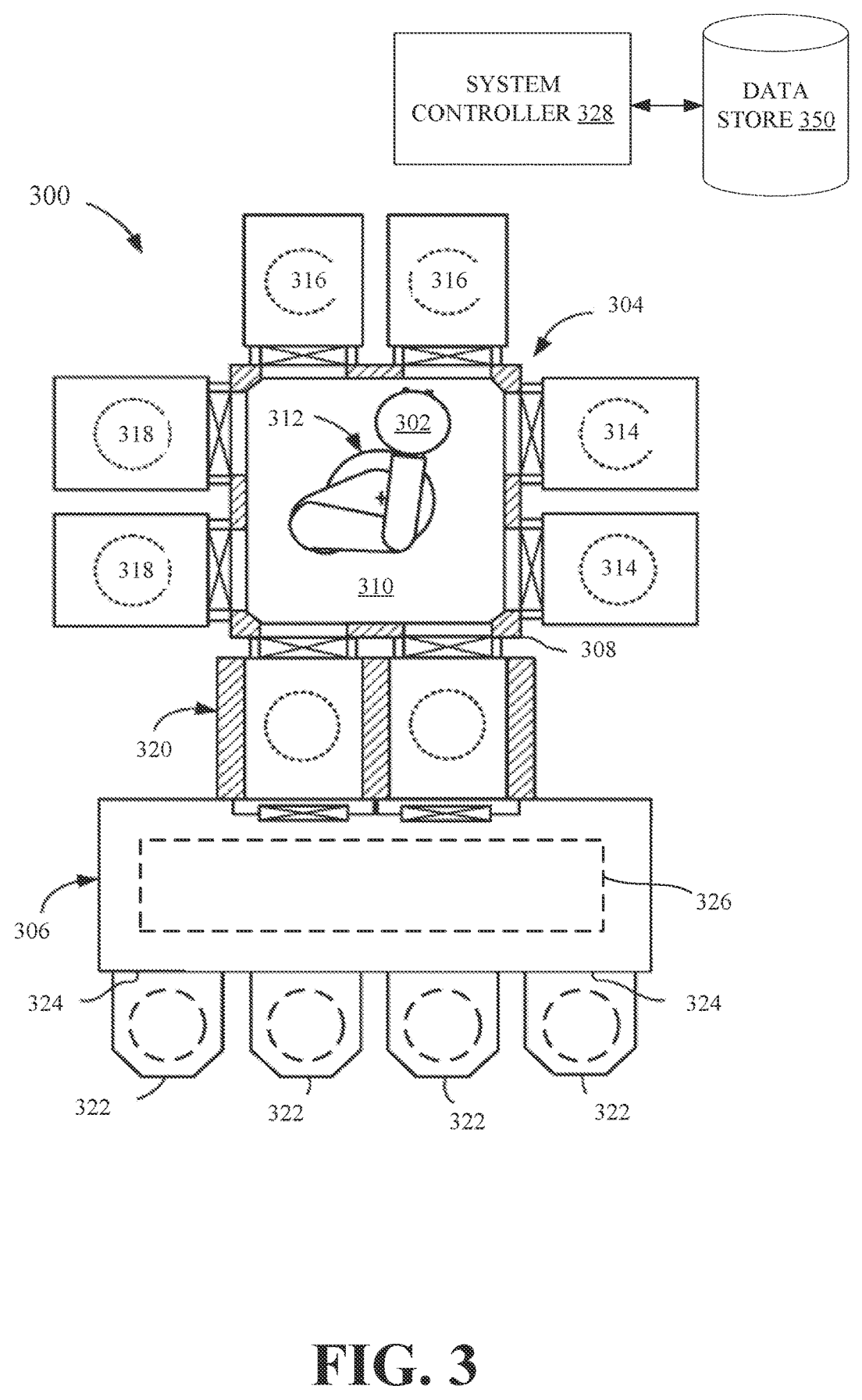

FIG. 3 is a top schematic view of an example manufacturing system 300, according to aspects of the present disclosure. Manufacturing system 300 can perform one or more processes on a substrate 302. Substrate 302 can be any suitably rigid, fixed-dimension, planar article, such as, e.g., a silicon-containing disc or wafer, a patterned wafer, a glass plate, or the like, suitable for fabricating electronic devices or circuit components thereon.

Manufacturing system 300 can include a process tool 304 and a factory interface 306 coupled to process tool 304. Process tool 304 can include a housing 308 having a transfer chamber 310 therein. Transfer chamber 310 can include one or more process chambers (also referred to as processing chambers) 314, 316, 318 disposed therearound and coupled thereto. Process chambers 314, 316, 318 can be coupled to transfer chamber 310 through respective ports, such as slit valves or the like. Transfer chamber 310 can also include a transfer chamber robot 312 configured to transfer substrate 302 between process chambers 314, 316, 318, load lock 320, etc. Transfer chamber robot 312 can include one or multiple arms where each arm includes one or more end effectors at the end of each arm. The end effector can be configured to handle particular objects, such as wafers, sensor discs, sensor tools, etc.

Process chambers 314, 316, 318 can be adapted to carry out any number of processes on substrates 302. A same or different substrate process can take place in each processing chamber 314, 316, 318. A substrate process can include atomic layer deposition (ALD), physical vapor deposition (PVD), chemical vapor deposition (CVD), etching, annealing, curing, pre-cleaning, metal or metal oxide removal, or the like. Other processes can be carried out on substrates therein. Process chambers 314, 316, 318 can each include one or more sensors configured to capture data for substrate 302 before, after, or during a substrate process. For example, the one or more sensors can be configured to capture spectral data and/or non-spectral data for a portion of substrate 302 during a substrate process. In other or similar embodiments, the one or more sensors can be configured to capture data associated with the environment within process chamber 314, 316, 318 before, after, or during the substrate process. For example, the one or more sensors can be configured to capture data associated with a temperature, a pressure, a gas concentration, etc. of the environment within process chamber 314, 316, 318 during the substrate process.

A load lock 320 can also be coupled to housing 308 and transfer chamber 310. Load lock 320 can be configured to interface with, and be coupled to, transfer chamber 310 on one side and factory interface 306. Load lock 320 can have an environmentally-controlled atmosphere that can be changed from a vacuum environment (wherein substrates can be transferred to and from transfer chamber 310) to at or near atmospheric-pressure inert-gas environment (wherein substrates can be transferred to and from factory interface 306) in some embodiments. Factory interface 306 can be any suitable enclosure, such as, e.g., an Equipment Front End Module (EFEM). Factory interface 306 can be configured to receive substrates 302 from substrate carriers 322 (e.g., Front Opening Unified Pods (FOUPs)) docked at various load ports 324 of factory interface 306. A factory interface robot 326 (shown dotted) can be configured to transfer substrates 302 between carriers (also referred to as containers) 322 and load lock 320. Carriers 322 can be a substrate storage carrier or a replacement part storage carrier.

Manufacturing system 300 can also be connected to a client device (not shown) that is configured to provide information regarding manufacturing system 300 to a user (e.g., an operator). In some embodiments, the client device can provide information to a user of manufacturing system 300 via one or more graphical user interfaces (GUIs). For example, the client device can provide information regarding a target thickness profile for a film to be deposited on a surface of a substrate 302 during a deposition process performed at a process chamber 314, 316, 318 via a GUI. The client device can also provide information regarding a modification to a process recipe in view of a respective set of deposition settings predicted to correspond to the target profile, in accordance with embodiments described herein.

Manufacturing system 300 can also include a system controller 328. System controller 328 can be and/or include a computing device such as a personal computer, a server computer, a programmable logic controller (PLC), a microcontroller, and so on. System controller 328 can include one or more processing devices, which can be general-purpose processing devices such as a microprocessor, central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device can also be one or more special-purpose processing devices such as an application specific integrated circuit (ASIC), a field programmable gate array (FPGA), a digital signal processor (DSP), network processor, or the like. System controller 328 can include a data storage device (e.g., one or more disk drives and/or solid state drives), a main memory, a static memory, a network interface, and/or other components. System controller 328 can execute instructions to perform any one or more of the methodologies and/or embodiments described herein. In some embodiments, system controller 328 can execute instructions to perform one or more operations at manufacturing system 300 in accordance with a process recipe. The instructions can be stored on a computer readable storage medium, which can include the main memory, static memory, secondary storage and/or processing device (during execution of the instructions).

System controller 328 can receive data from sensors included on or within various portions of manufacturing system 300 (e.g., processing chambers 314, 316, 318, transfer chamber 310, load lock 320, etc.). In some embodiments, data received by the system controller 328 can include spectral data and/or non-spectral data for a portion of substrate 302. In other or similar embodiments, data received by the system controller 328 can include data associated with processing substrate 302 at processing chamber 314, 316, 318, as described previously. For purposes of the present description, system controller 328 is described as receiving data from sensors included within process chambers 314, 316, 318. However, system controller 328 can receive data from any portion of manufacturing system 300 and can use data received from the portion in accordance with embodiments described herein. In an illustrative example, system controller 328 can receive data from one or more sensors for process chamber 314, 316, 318 before, after, or during a substrate process at the process chamber 314, 316, 318. Data received from sensors of the various portions of manufacturing system 300 can be stored in a data store 350. Data store 350 can be included as a component within system controller 328 or can be a separate component from system controller 328. In some embodiments, data store 350 can be data store 140 described with respect to FIG. 1.

Figure 4:
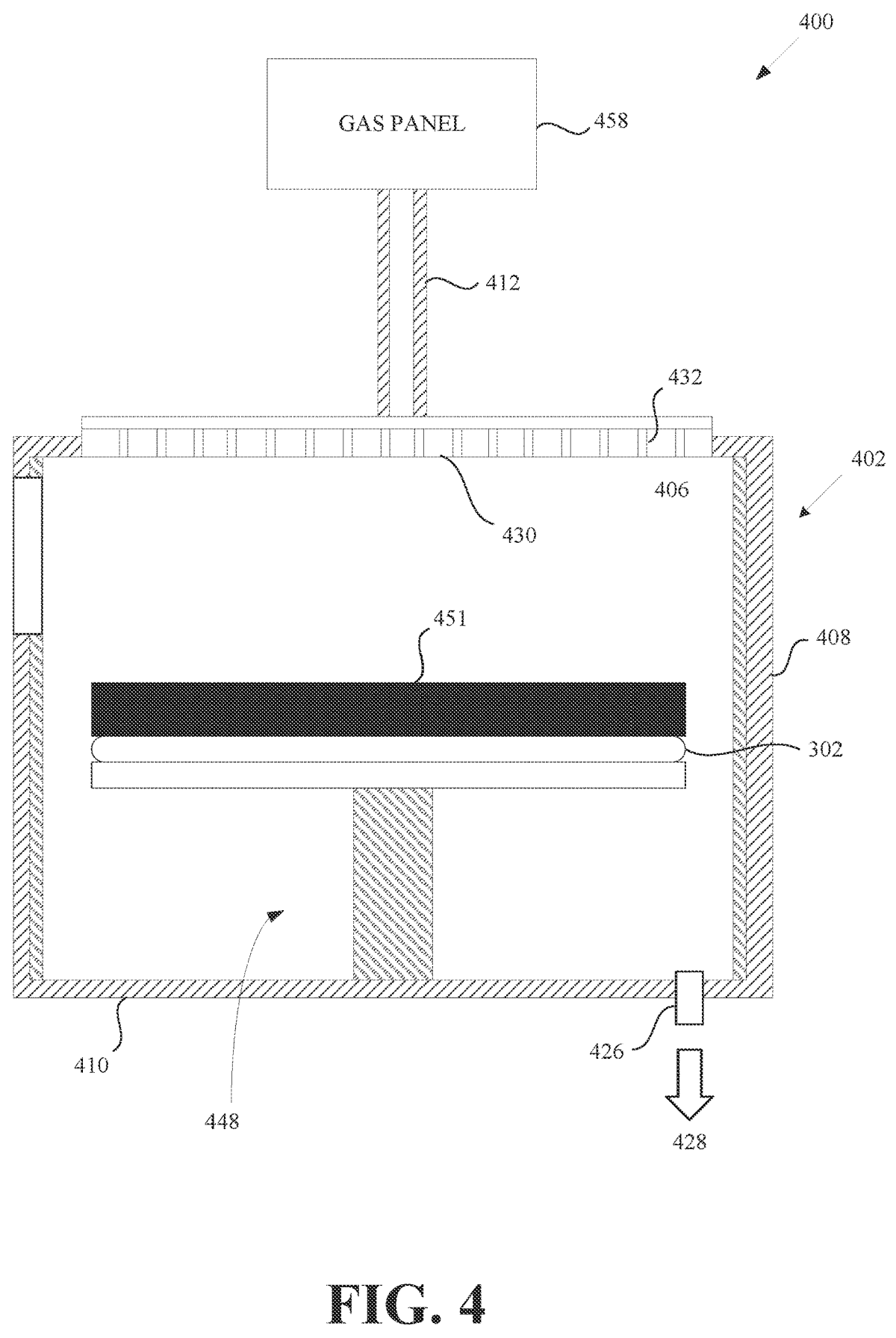

FIG. 4 is a cross-sectional schematic side view of a process chamber 400, in accordance with embodiments of the present disclosure. In some embodiments, process chamber 400 can correspond to process chamber 314, 316, 318, described with respect to FIG. 3. Process chamber 400 can be used for processes in which a corrosive plasma environment is provided. For example, the process chamber 400 can be a chamber for a plasma etcher or plasma etch reactor, and so forth. In another example, process chamber can be a chamber for a deposition process, as previously described. In one embodiment, the process chamber 400 includes a chamber body 402 and a showerhead 430 that encloses an interior volume 406. The showerhead 430 can include a showerhead base and a showerhead gas distribution plate. Alternatively, the showerhead 430 can be replaced by a lid and a nozzle in some embodiments, or by multiple pie shaped showerhead compartments and plasma generation units in other embodiments. The chamber body 402 can be fabricated from aluminum, stainless steel or other suitable material such as titanium (Ti). The chamber body 402 generally includes sidewalls 408 and a bottom 410. An exhaust port 426 can be defined in the chamber body 402, and can couple the interior volume 406 to a pump system 428. The pump system 428 can include one or more pumps and throttle valves utilized to evacuate and regulate the pressure of the interior volume 406 of the process chamber 400.

The showerhead 430 can be supported on the sidewall 408 of the chamber body 402. The showerhead 420 (or lid) can be opened to allow access to the interior volume 406 of the process chamber 400, and can provide a seal for the process chamber 400 while closed. A gas panel 458 can be coupled to the process chamber 400 to provide process and/or cleaning gases to the interior volume 406 through the showerhead 430 or lid and nozzle (e.g., through apertures of the showerhead or lid and nozzle). For example. gas panel 458 can provide precursors for materials of a film 451 deposited on a surface of a substrate 302. In some embodiments, a precursor can include a silicon-based precursor or a boron-based precursor. The showerhead 430 can include a gas distribution plate (GDP) and can have multiple gas delivery holes 432 (also referred to as channels) throughout the GDP. A substrate support assembly 448 is disposed in the interior volume 406 of the process chamber 400 below the showerhead 430. The substrate support assembly 448 holds a substrate 302 during processing (e.g., during a deposition process).

In some embodiments, processing chamber 400 can include metrology equipment (not shown) configured to generate in-situ metrology measurements during a process performed at process chamber 400. The metrology equipment can be operatively coupled to the system controller (e.g., system controller 328, as previously described). In some embodiments, the metrology equipment can be configured to generate a metrology measurement value (e.g., a thickness) for film 451 during particular instances of the deposition process. The system controller can generate a thickness profile for film 451 based on the received metrology measurement values from the metrology equipment. In other or similar embodiments, processing chamber 400 does not include metrology equipment. In such embodiments, the system controller can receive one or more metrology measurement values for film 451 after completion of the deposition process at process chamber 400. System controller can determine a deposition rate based on the one or more metrology measurement values and can associate generate the thickness profile for film 451 based on the determined concentration gradient and the determined deposition rate of the deposition process. In some embodiments, the metrology equipment can be used to generate metrology measurement values of one or more structure (e.g., mandrels) generated by an etch process.

FIG. 6 is a flow chart of a method 600 for modifying a process recipe (e.g., an etch recipe) using a feature model, according to aspects of the present disclosure. Method 600 is performed by processing logic that can include hardware (circuitry, dedicated logic, etc.), software (such as is run on a general purpose computer system or a dedicated machine), firmware, or some combination thereof. In one implementation, method 600 can be performed by a computer system, such as computer system architecture 100 of FIG. 1. In other or similar implementations, one or more operations of method 600 can be performed by one or more other machines not depicted in the figures. In some aspects, one or more operations of method 600 can be performed by server machine 170, server machine 180, and/or predictive server 112.

In embodiments, method 600 is performed as part of a design of experiments DoE process. In embodiments, processing logic and/or a user may design objective cost functions, may generate a space filling design, may perform dimensionality reduction, and may run a first set of experiments. Each of the first set of experiments may include processing one or more substrates using a version of a process recipe, and then measuring one or more properties and/or features of the one or more processed substrates using metrology equipment.

At operation 610, the processing logic obtains settings data correlating to a process recipe. The setting data can relate to one or more hardware parameters of the manufacturing equipment. In particular, the process recipe can define a particular set of operations to be performed for the substrate during the process. The process recipe can further include one or more settings associated with each operation. The settings can control a temperature setting for the process chamber, a pressure setting for the process chamber, a power setting for the plasma, etc. The settings data can include the values correlating to the settings (e.g., voltage, pressure, temperature, etc.).

At operation 612, the processing logic performs the manufacturing process according to the process recipe. For example, the processing logic can perform the etch process, the deposition process, etc. specified by the process recipe.

At operation 614, the processing logic obtains metrology data related to the substrate processed by the manufacturing process. For example, an etch process can generate a set of mandrels on the surface of a substrate. The processing logic can obtain a set of values related to the value of mandrel properties (e.g., thickness, height, spacing, etc.), the film property data of the mandrels, etc.

In some embodiments, operations 610-614 are associated with performing an initial stage of a multi-objective DoE. For example, multiple versions of a recipe may be run according to a multiple-objective DoE, and metrology data may be collected for each version of the recipe. This data may then be used in accordance with further operations of method 600 to select recipe settings for one or more next experiments in the DoE. Method 600 may be executed to perform adaptive multi-objective DOE augmentation in embodiments (e.g., to identify one or more optimal additional experiments to run). Method 600 may results in a convergent result of a multi-objective DOE with a fewest possible number of additional points or experiments.

In some embodiments, the processing logic can perform one or more pre-processing operations on the metrology data and/or the settings data. For example, the processing logic can reduce the dimensionality of the data. Dimensionality reduction can refer to the process of reducing the number of attributes in a dataset while keeping as much of the variation in the original dataset as possible. The processing logic can use one or more methods to reduce the dimensionality of the data, such as, for example, Principal Component Analysts (PCA), T-distributed Stochastic Neighbor Embedding (t-SNE), etc.

At operation 616, the processing logic can apply a set of feature models (e.g. model 190) to the obtained metrology data and the setting data. In some embodiments, the set of feature models can include a set of Bayesian probabilistic models. Each individual feature model can model a particular set of features. For example, Bayesian probabilistic model A can model the actual and/or predictive correlations between mandrel height and process chamber pressure, Bayesian probabilistic model B can model the actual and/or predictive correlations between mandrel spacing and plasma temperature, for example. Input to a feature model can include manufacturing parameters (e.g., process parameters, hardware parameters), metrology data, target property data, etc. The output data of the feature models can include a probabilistic function indicative of the correlation of two or more features (e.g., the metrology data, the setting data, etc.).

At operation 618, the processing logic can input the output data and the feature target data into a numerical optimizer (e.g., numerical optimizer 230). The feature target data can include target properties of the substrate (e.g., target properties 210). The processing logic can then obtain, via the numerical optimizer, a Pareto frontier including at least one set of Pareto efficient manufacturing settings.

Figures 7A, 7B:
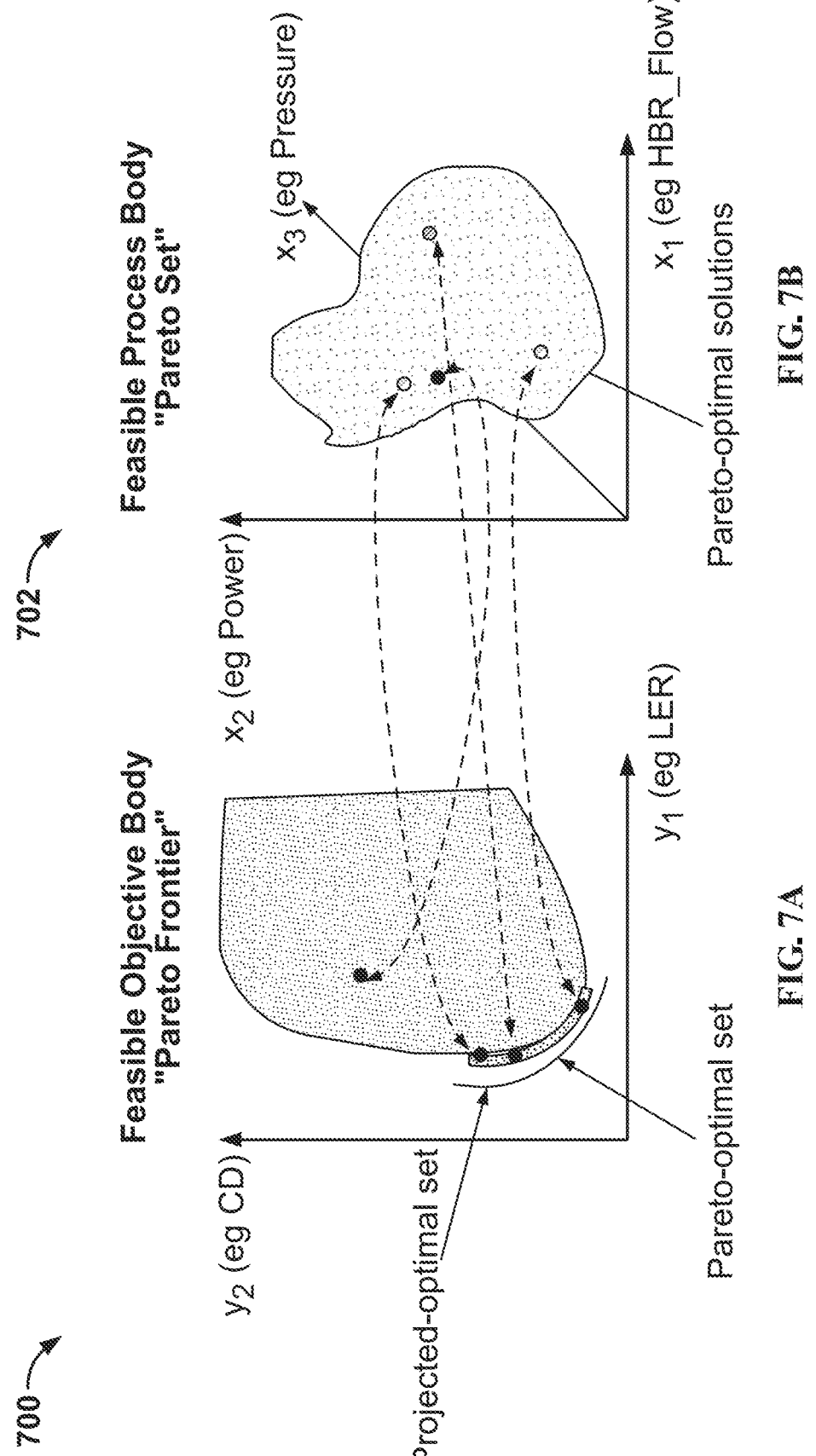
FIG. 7A shows a feasible objective body Pareto frontier, according to certain embodiments.
FIG. 7B shows a feasible process body Pareto set, according to certain embodiments.

At operation 620, the processing logic selects one or more new manufacturing setting values to adjust the manufacturing process (e.g., etch process). In some embodiments, the processing logic can automatically select the new settings values via, for example, the corrective action component 122. For example, the processing logic can select the new settings values based on, for example, which values are closest to the optimal Pareto front curve (e.g., curve 248A of FIG. 2). In some embodiments, the new settings values can be selected by user input (e.g., by an operator or engineer). The processing logic can adjust the process recipe based on the new values and proceed to operation 612 to perform the manufacturing process according to the process recipe on a new substrate. Accordingly, processing logic can determine one or more next experiments for a DoE. In some embodiments, processing logic determines an expected improvement to the recipe associated with the next experiment. In some embodiments, the expected improvement is an expected improvement over a hypervolume. Processing logic may provide a graphical user interface (GUI) that shows progress of a Pareto frontier, a dominated process space, EHI function, and/or a projected ideal Pareto frontier in embodiments. The one or more new manufacturing setting values for the manufacturing process may be one or more (e.g., N) best points, which may have been selected on a basis of the EHI in embodiments. In embodiments, the process body is sampled where there is a highest probability for improvement of the Pareto frontier, which results in a minimal cumulative regret. FIG. 7A shows a feasible objective body Pareto Frontier, and FIG. 7B shows a feasible process body Pareto Set, according to one embodiment. The Pareto Frontier can refer to a set of metrology data or physical properties of a substrate (e.g., property data of a mandrel, such as, mandrel height, mandrel width, etc.). The Pareto Set can refer to a set of recipe settings (e.g., pressure, power, temperature, etc.). In particular, graph 700 in FIG. 7A shows line edge roughness (LER) on the x-axis and the critical dimension on the y-axis, while graph 702 in FIG. 7B shows, relating to a process chamber, the flow rate on the x-axis, the pressure on the y-axis and the power on the z-axis. The points of graph 702 are correlated to the points of graph 700, and as the points on graph 700 are advance towards the optimal set, the resulting process settings are determined. The new points can be determined using the feature model(s), as described herein.

The operations of method 600 can be repeatedly looped to optimize the process recipe. Accordingly, the settings values and feature models can be updated with each loop to produce a product (e.g., set of mandrels) closer to the desired parameters with each loop. For example, each optimized recipe can converge the physical features of the mandrels illustrated in FIG. 5B closer to the physical features of the mandrels illustrated in FIG. 5A. Once a process recipe is optimized, the operations of method 600 can cease, and the process recipe can be used for future manufacturing purposes.

FIGS. 8A-10D are illustrations of the advancement of the Pareto set and the Pareto Frontier, according to some embodiments. In particular, FIGS. 8A-8B illustrate graphs showings the Pareto Frontier (FIG. 8A) and the Pareto Set (FIG. 8B) of an initial population epoch (e.g., 248B), FIGS. 9A-9B illustrate graphs showings the Pareto Frontier (FIG. 9A) and the Pareto Set (FIG. 9B) of a middle population epoch (e.g., 248C), and FIGS. 10A-10B illustrate graphs showings the Pareto Frontier (FIG. 10A) and the Pareto Set (FIG. 10B) of a final population epoch (e.g., 248D). As illustrated, using values from the Pareto set to adjust (the process recipe is optimized (e.g., adjusted using new setting values) causes the property features reflected by the Pareto Frontier to move towards the desired correlation between two property features (not shown in FIGS. 8A, 9A, and 10A, but shown as 248A in FIG. 2D). FIGS. 8C, 9C, and 10C illustrate respective probability graphs which indicate a likely correlation between one or more features and one or more settings parameters. FIGS. 8D, 9D, and 10D illustrate respective probability maps showing the probability of non-domination (process space), where the white zone (unshaded zone) shows correlations between one or more features and one or more settings parameters where possibly adjustments to the process recipe can be obtained, and the black zone (shaded zone) show correlations between one or more features and one or more settings parameters possibly adjustments to the process recipe don't exist.

Figure 11:
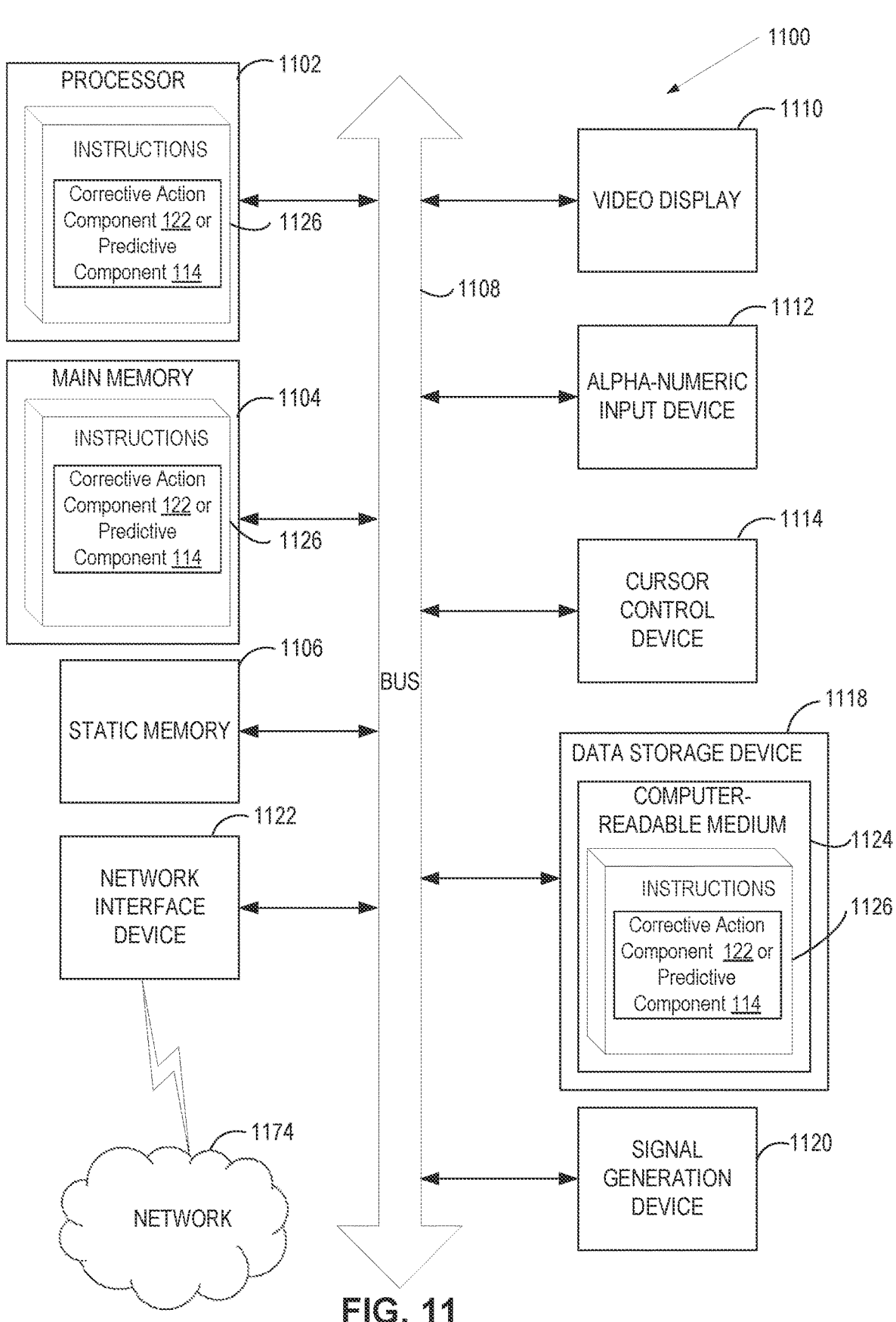
FIG. 11 is a block diagram illustrating a computer system, according to certain embodiments.

FIG. 11 is a block diagram illustrating a computer system 1100, according to certain embodiments. In some embodiments, computer system 1100 may be connected (e.g., via a network, such as a Local Area Network (LAN), an intranet, an extranet, or the Internet) to other computer systems. Computer system 1100 may operate in the capacity of a server or a client computer in a client-server environment, or as a peer computer in a peer-to-peer or distributed network environment. Computer system 1100 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1100 may include a processing device 1102, a volatile memory 1104 (e.g., Random Access Memory (RAM)), a non-volatile memory 1106 (e.g., Read-Only Memory (ROM) or Electrically-Erasable Programmable ROM (EEPROM)), and a data storage device 1116, which may communicate with each other via a bus 1108.

Processing device 1102 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 1100 may further include a network interface device 1122 (e.g., coupled to network 1174). Computer system 1100 also may include a video display unit 1110 (e.g., an LCD), an alphanumeric input device 1112 (e.g., a keyboard), a cursor control device 1114 (e.g., a mouse), and a signal generation device 1120.

In some implementations, data storage device 1116 may include a non-transitory computer-readable storage medium 1124 on which may store instructions 1126 encoding any one or more of the methods or functions described herein, including instructions encoding components of FIG. 1 (e.g., corrective action component 122, predictive component 114, etc.) and for implementing methods described herein.

Instructions 1126 may also reside, completely or partially, within volatile memory 1104 and/or within processing device 1102 during execution thereof by computer system 1100, hence, volatile memory 1104 and processing device 1102 may also constitute machine-readable storage media.

While computer-readable storage medium 1124 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "providing," "obtaining," "causing," "accessing," "determining," "adding," "using," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations.

Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:

performing, by manufacturing equipment, a first process on a first substrate according to a process recipe, wherein the process recipe comprises a plurality of setting parameters, wherein the first process generates a plurality of features on a surface of the first substrate;

generating metrology data associated with the plurality of features;

inputting the metrology data and at least one setting parameter of the plurality of setting parameters into one or more Bayesian probabilistic models;

receiving an output from the one or more Bayesian probabilistic models, wherein the output comprises output data indicative of correlations between the at least one setting parameter and the metrology data;

obtaining at least one target parameter comprising a physical attribute of a feature of the plurality of features;

generating, based on the output data and the at least one target parameter, a Pareto frontier including at least one set of Pareto efficient manufacturing settings;

selecting a value associated with the Pareto frontier which is closest to a curve indicative of a setting of target parameters;

updating the process recipe by modifying the at least one setting parameter of the plurality of setting parameters using the selected value; and performing, by the manufacturing equipment, a second process on a second substrate according to the updated process recipe.

2. The method of claim 1, wherein the features are etch features that comprise a set of mandrels.

3. The method of claim 1, further comprising:

updating the one or more Bayesian probabilistic models based on at least one of the updated process recipe or metrology data associated with the second process.

4. The method of claim 1, further comprising:

generating the one or more of the Bayesian probabilistic models using a design of experiment (DoE) technique.

5. The method of claim 1, further comprising:

performing a dimensionality reduction operation on the metrology data.

6. An electronic device manufacturing system, comprising:

a memory device; and a processing device, operatively coupled to the memory device, to perform operations comprising:

causing manufacturing equipment to perform a first process on a first substrate according to a process recipe, wherein the process recipe comprises a plurality of setting parameters, wherein the first process generates a plurality of features on a surface of the first substrate;

generating metrology data associated with the plurality of features;

inputting the metrology data and at least one setting parameter of the plurality of setting parameters into one or more Bayesian probabilistic models;

receiving an output from the one or more Bayesian probabilistic models, wherein the output comprises output data indicative of correlations between the at least one setting parameter and the metrology data;

obtaining at least one target parameter comprising a physical attribute of a feature of the plurality of features;

generating, based on the output data and the at least one target parameter, a Pareto frontier including at least one set of Pareto efficient manufacturing settings;

selecting a value associated with the Pareto frontier which is closest to a curve indicative of a setting of target parameters;

updating the process recipe by modifying the at least one setting parameter of the plurality of setting parameters using the selected value; and causing the manufacturing equipment to perform a second process on a second substrate according to the updated process recipe.

7. The electronic device manufacturing system of claim 6, wherein the features are etch features that comprise a set of mandrels.

8. The electronic device manufacturing system of claim 6, wherein the processing device is further to perform operations comprising:

updating the one or more Bayesian probabilistic models based on at least one of the updated process recipe or metrology data associated with the second process.

9. The electronic device manufacturing system of claim 6, wherein the processing device is further to perform operations comprising:

generating the one or more of the Bayesian probabilistic models using a design of experiment (DoE) technique.

10. The electronic device manufacturing system of claim 6, wherein the processing device is further to perform operations comprising:

performing a dimensionality reduction operation on the metrology data.

11. A non-transitory computer-readable storage medium comprising instructions that, when executed by a processing device operatively coupled to a memory, performs operations comprising:

causing manufacturing equipment to perform a first process on a first substrate according to a process recipe, wherein the process recipe comprises a plurality of setting parameters, wherein the first process generates a plurality of features on a surface of the first substrate;

generating metrology data associated with the plurality of features;

inputting the metrology data and at least one setting parameter of the plurality of setting parameters into one or more Bayesian probabilistic models;

receiving an output from the one or more Bayesian probabilistic models, wherein the output comprises output data indicative of correlations between the at least one setting parameter and the metrology data;

obtaining at least one target parameter comprising a physical attribute of a feature of the plurality of features;

generating, based on the output data and the at least one target parameter, a Pareto frontier including at least one set of Pareto efficient manufacturing settings;

selecting a value associated with the Pareto frontier which is closest to a curve indicative of a setting of target parameters;

updating the process recipe by modifying the at least one setting parameter of the plurality of setting parameters using the selected value; and causing the manufacturing equipment to perform a second process on a second substrate according to the updated process recipe.

12. The non-transitory computer-readable storage medium of claim 11, wherein the features are etch features that comprise a set of mandrels.

13. The non-transitory computer-readable storage medium of claim 11, wherein the processing device is further to perform operations comprising:

updating the one or more Bayesian probabilistic models based on at least one of the updated process recipe or metrology data associated with the second process.

14. The non-transitory computer-readable storage medium of claim 11, wherein the processing device is further to perform operations comprising:

generating the one or more of the Bayesian probabilistic models using a design of experiment (DoE) technique.

* * * * *